United States Patent [19]
Bates

[11] Patent Number: 5,805,750
[45] Date of Patent: Sep. 8, 1998

[54] OPTICAL WAVEFRONT CORRECTION FOR VARIABLE GROOVE DEPTH GRATING WAVEGUIDE COUPLERS

[75] Inventor: Allen Keith Bates, Tucson, Ariz.

[73] Assignee: International Business Machines Corporation, Armonk, N.Y.

[21] Appl. No.: 804,458

[22] Filed: Feb. 21, 1997

[51] Int. Cl.$^6$ .................................................. G02B 6/34
[52] U.S. Cl. ............................................................ 385/37
[58] Field of Search ............................ 359/573; 385/37, 385/10

[56] References Cited

U.S. PATENT DOCUMENTS

| | | | |
|---|---|---|---|
| 5,022,730 | 6/1991 | Cimini et al. | 385/37 |
| 5,101,459 | 3/1992 | Sunagawa | 385/37 |
| 5,276,745 | 1/1994 | Revelli, Jr. | 385/14 |
| 5,315,676 | 5/1994 | Sunagawa | 385/37 |
| 5,361,244 | 11/1994 | Nakamura et al. | 369/44.23 |
| 5,471,548 | 11/1995 | Brazas | 385/37 |

OTHER PUBLICATIONS

A. Keith Bates, J. Kevin Erwin, Lifeng Li:, and James J. Burke "*Output Beam Quality of Variable Groove Depth Grating Wave Guide Couplers*", Optical Sciences Center, University of Arizona, Tucson, AZ 85721, Jul. 8, 1996.

*Primary Examiner*—John Ngo
*Attorney, Agent, or Firm*—John H. Holcombe; Robert M. Sullivan

[57] ABSTRACT

A variable groove depth grating coupler located on a surface of an optical waveguide which couples a guided optical wave traveling in the optical waveguide to an outcoupled external wave has a resultant variable effective refractive index creating an aberration in the outcoupled optical wavefront. The wavefront aberration is corrected by providing the coupler grooves at a variable grating period which offsets effects of the variable effective refractive index on the wavefront aberrations.

12 Claims, 3 Drawing Sheets

X = DISTANCE FROM OUTPUT BEAM CENTER

A = GUIDED WAVE AMPLITUDE $n_a$ = EXTERNAL (AIR) REFRACTIVE INDEX $n_c$ = WAVEGUIDE FILM REFRACTIVE INDEX $n_s$ = WAVEGUIDE SUBSTRATE REFRACTIVE INDEX h = DEPTH OF GROOVES d = GRATING PERIOD

θ = OUTPUT COUPLING ANGLE

X = DISTANCE FROM OUTPUT BEAM CENTER

A = GUIDED WAVE AMPLITUDE $n_a$ = EXTERNAL (AIR) REFRACTIVE INDEX $n_c$ = WAVEGUIDE FILM REFRACTIVE INDEX $n_s$ = WAVEGUIDE SUBSTRATE REFRACTIVE INDEX h = DEPTH OF GROOVES d = GRATING PERIOD

θ = OUTPUT COUPLING ANGLE

OPTICAL WAVEFRONT CORRECTION FOR VARIABLE GROOVE DEPTH GRATING WAVEGUIDE COUPLERS

TECHNICAL FIELD

This invention relates to grating waveguide couplers, and, more particularly, to variable groove depth grating waveguide couplers.

BACKGROUND OF THE INVENTION

Grating couplers provide a means for directing optical waves between an optical waveguide and a medium, for example, in an optical head for directing optical waves from a laser through air to an optical disk, where it is reflected back to the optical head. The optical head thus provides for the storage and/or retrieval of information on optical disk. The evolution of optical heads has resulted in light weight integrated optical systems which may be mass produced using planar fabrication techniques.

Such integrated optical heads typically comprise a laser diode at one end of the waveguide to produce the guided wave, a grating coupler to direct the wave to a spot on the moving optical disk and to receive the reflected beam and couple the beam into the waveguide, and photodiodes for detecting the reflected beam to provide readout signal, focus error and tracking error outputs.

Optical disk systems may comprise read only system or may employ the laser to both write and read.

Read only optical disks store the information by use of a molded media which stores the data by the patterning of the media on which is applied a reflective coating. The data is read by focussing a laser beam on the media as it is rotated and measuring the strength of the reflected beam at a point in the return path.

Write once recording may store the data on a disk by ablation or "burning" which reduces the reflectivity at written spots.

Rewritable optical disk drives store the data by focusing a laser beam onto a spot of the data layer of the disk to heat the layer. The data is read by focusing a laser beam onto the data layer of the disk and then detecting the reflected light beam.

In magneto-optical recording, the laser heats the spot above its Curie temperature while the magnetic domain of the spot is oriented in either an up or a down direction by an external magnetic field. The data is read by directing a low power laser spot to the data layer. The differences in magnetization direction of the spots cause the plane of polarization of the reflected light beam to be rotated either clockwise or counterclockwise. This change in orientation of polarization of the reflected light is then detected.

In phase-change recording, the laser heats the spot to cause a structural change of the data layer, typically from a crystalline phase to an amorphous phase. The data is detected as changes in reflectivity between the two phases.

In each of these systems, it is important that the provided laser beam be of appropriate intensity distribution and without aberration in order to allow the minute changes in polarization or of reflectivity to be measured accurately in order to detect the recorded data properly.

In addition, the nature of the optical head which is used to direct the laser beam and the reflected beam is to separate the beam into different parts for purposes such as focus servo detection and lateral tracking servo detection, as well as for data detection. The focus servo measures the reflected beam to determine whether it is in focus, and operates a servo to move the beam foci as necessary to maintain the focus. The lateral tracking servo measures the reflected beam to determine whether the spot is at the center of a track of the optical disk as the disk is rotated, and operates a servo to move the beam as necessary to maintain the spot at the center of the track.

Lenses, mirrors and prisms have been used to split and redirect the beam for these purposes, but an efficient and consistent means of doing so comprises integrated optics and grating waveguide couplers, as discussed above.

Another use of grating waveguide couplers is related to the need to increase the density of data and thereby increase the quantity of data that may be stored on optical disks. A way of increasing the density of optical data is by decreasing the size of the focussed spot. The best way of decreasing the spot size is to increase the frequency of the laser light, which results in a decreased wavelength and thereby spot size. Since lasers are limited to a few lasing frequencies, the best way currently known to increase the output frequency is to utilize higher harmonic frequencies of the lasing frequency and optimize the system to separate out and amplify these higher harmonic frequencies. Grating waveguide couplers provide a highly efficient means for coupling light into and out of waveguides used to generate the higher frequency light. They also provide a means for shaping the intensity of the beam to be optimized for the needs of optical disk data storage and retrieval.

The intensity distribution of the light beam that is best suited for the needs of optical disk is a Gaussian intensity distribution, also called a Gaussian amplitude wave shape.

U.S. Pat. No. 5,314,676, Sunagawa, assigned to Fuji Photo Film Co., Ltd., illustrates a grating waveguide coupler which produces an approximate Gaussian beam comprising a variable groove height grating waveguide coupler. The variable groove depth grating waveguide coupler of the '676 patent comprises a series of grating bars which increase in height approximately linearly in the direction along which the guided optical wave travels in the waveguide on which the waveguide coupler is provided.

The resultant intensity distribution is approximately Gaussian. Other variations in the heights of the bars, or depth of etching to form grooves, may be made to more accurately produce a Gaussian intensity distribution.

A major problem of a variable bar height or variable groove depth grating waveguide coupler is that it has a resultant variable effective refractive index creating an aberration in the outcoupled optical wavefront. The resultant aberration causes many problems, chief of which is that the focussing of the beam cannot be made sharp so that the resultant beam spot size is not at the diffraction limit. The use of the beam in an optical disk is impaired and not efficient.

What is needed is a coupler which will efficiently couple light to and from waveguides with predictable intensity distribution and wavefront quality.

SUMMARY OF THE INVENTION

Disclosed is a variable groove depth grating coupler located on a surface of an optical waveguide which couples a guided optical wave traveling in the optical waveguide to an outcoupled external wave. The coupler is provided with grooves at a variable grating period which offsets the variable effective refractive index. The potential wavefront aberration due to the variable effective refractive index is thereby corrected to form a wavefront with predictable intensity distribution and wavefront quality. The term "variable groove depth" also includes "variable bar height".

For a fuller understanding of the present invention, reference should be made to the following detailed description taken in conjunction with the accompanying drawings.

DETAILED DESCRIPTION OF THE INVENTION

Figure 1:
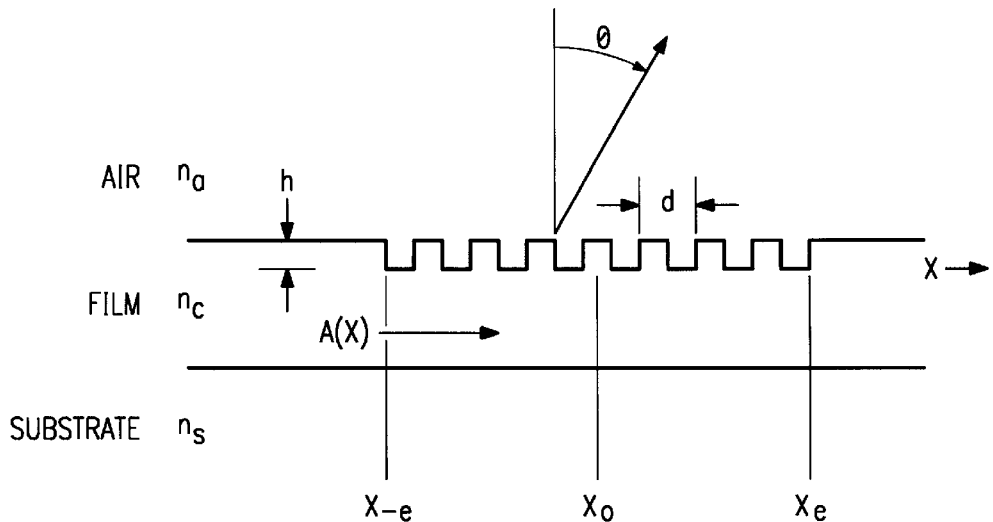
FIG. 1 is a diagrammatic representation of an optical waveguide grating coupler and an explanatory table.

Referring to FIG. 1, an optical waveguide grating output coupler is represented. The optical waveguide comprises a planar waveguide substrate and a film thereon in which the coupler grating is provided. The waveguide substrate index of refraction is $n_s$, the waveguide film index of refraction is $n_c$ and the external output index of refraction is $n_a$. The optical wave of amplitude A is propagated along the planar waveguide in the positive x direction and coupled out of the waveguide by the grooves of depth h and grating period d. The optical wave is outcoupled at the output coupling angle theta.

In the typical case, the external medium is air, with an index of refraction of 1.00.

As discussed above, it is important that the provided laser beam be of appropriate intensity distribution and without aberration in order to allow the minute changes in polarization or of reflectivity to be measured accurately in order to detect the recorded data properly. The same is true in order to properly position the beam and to write data properly.

If the depth h of the grooves in the grating coupler was constant, the leakage rate would be constant and the output beam intensity distribution would be exponential. An exponential intensity distribution tends to skew the beam dramatically from the center toward the edge and is not a suitable intensity distribution for optical disk applications.

As discussed in the '676 patent, the intensity distribution which is best suited for the needs of optical disk is Gaussian. The '676 patent approximates a Gaussian intensity distribution by providing grating coupler bars of linearly increasing height.

Figure 2:
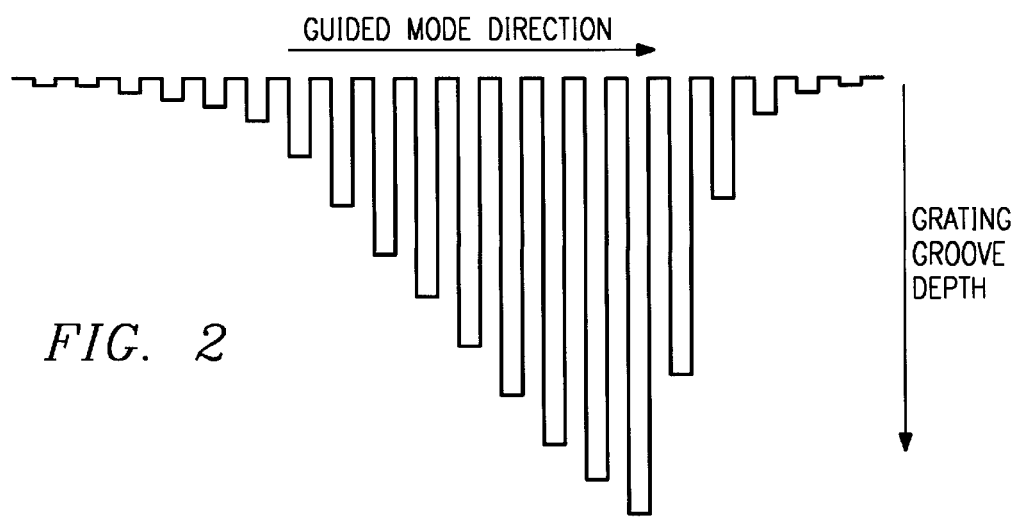
FIG. 2 is an exaggerated diagram of the variable groove depth of a variable groove depth grating coupler.

A more exact Gaussian intensity distribution may be provided by a variable groove depth coupler having grooves as illustrated in FIG. 2. The vertical dimension is greatly exaggerated with respect to the horizontal. In the typical situation, the grating depth is less than 1/10 of the grating period. The specific profile does not form any part of the present invention and is described in the paper *"Output beam quality of variable groove depth grating waveguide couplers"*, A. Keith Bates, J. Kevin Erwin, Lifeng Li, and James J. Burke, presented at ODS 96, Jul. 8, 1996. Using the variables of FIG. 1, in the example illustrated in the paper,
the substrate refractive index $n_s$ is 1.457, the waveguide film refractive index $n_c$ is 1.583 the external medium refractive index $n_a$ is 1.00, the grating period d is 0.400 micron, the grating length is 6 mm., and the maximum grating depth h is 0.1122 micron.

The formula presented in the above paper will provide similarly shaped variable groove depth grating waveguide couplers which are highly efficient, coupling 99% of the guided beam, and which provide a Gaussian intensity distribution for the output beam.

As discussed above, a major problem of a variable bar height or variable groove depth grating waveguide coupler is that it has a resultant variable effective refractive index creating an aberration in the outcoupled optical wavefront. The resultant aberration causes many problems, chief of which is that the focussing of the beam cannot be made sharp so that the resultant beam spot size is not at the diffraction limit. In order to meet the requirements of an efficient optical disk system, the wavefront aberration must be less than 1/10 of a wave. For example, a 0.6 micron wavelength beam requires the beam wavefront aberration to be less than 0.06 micron.

Special add-on optical components may be utilized to attempt to correct the wavefront aberration, but such components require a precise alignment step, and reduce the coupling efficiency.

The solution of the present invention is to provide the correction at the very beginning, at the variable groove depth grating waveguide coupler itself, thereby providing efficient light coupling with predictable intensity distribution and wavefront quality.

Figure 3:
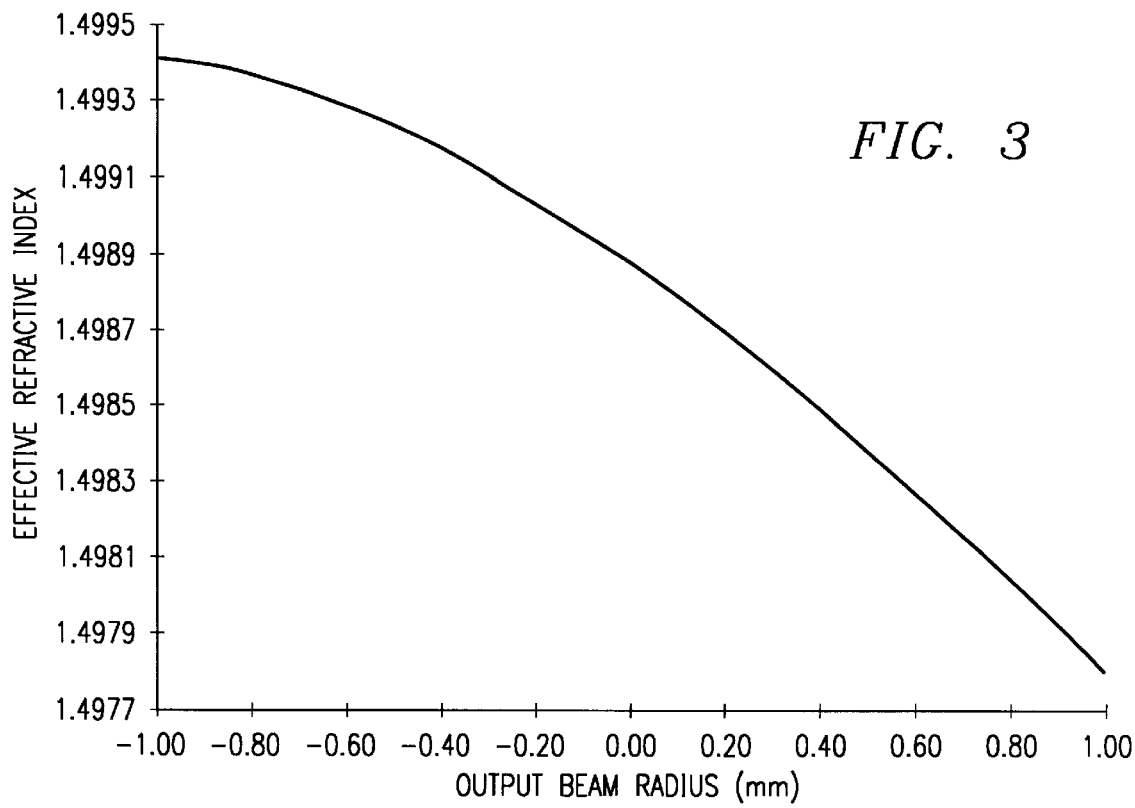
FIG. 3 is a graph of the effective refractive index of the variable groove depth grating coupler of FIG. 2.
Figure 4:
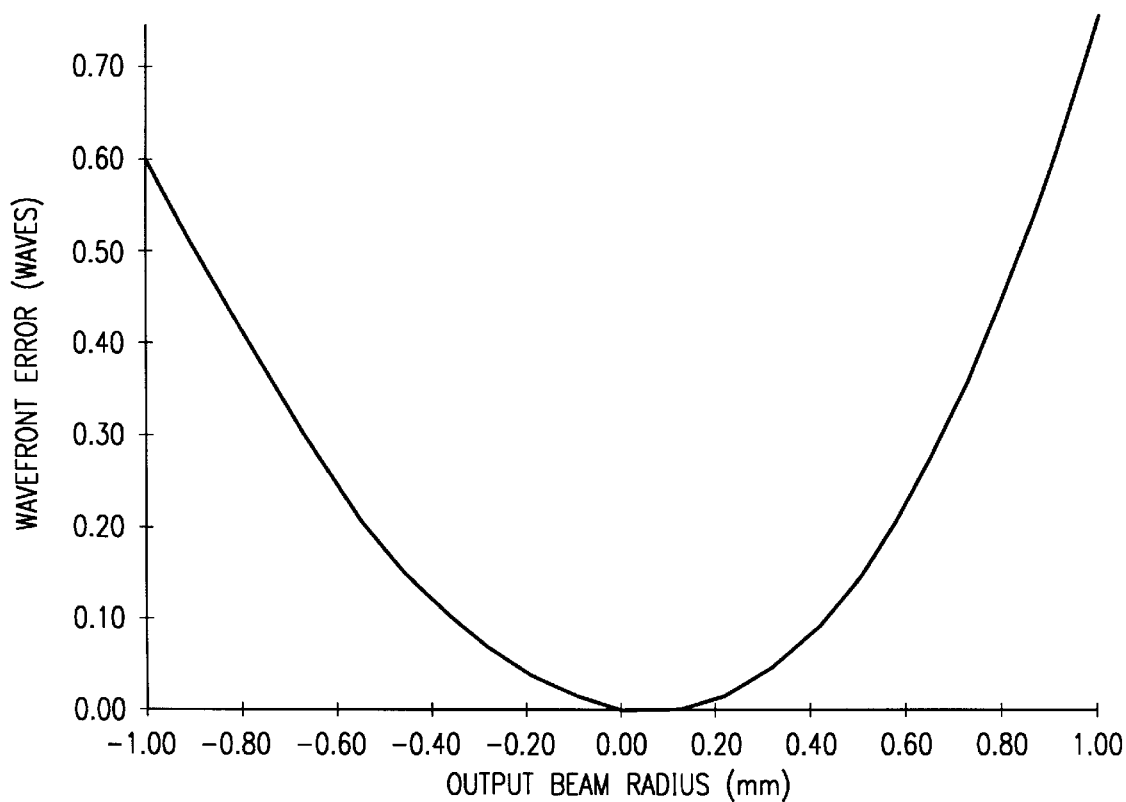
FIG. 4 is a graph of the wavefront error of the variable groove depth grating coupler of FIG. 2.

FIG. 3 illustrates the effective refractive index of the exemplary variable groove depth grating waveguide coupler (polystyrene) described in the Bates et al. paper, supra, for the usable portion of the outcoupled beam. The variation shown in the graph can be calculated and is typical of the Gaussian waveguide coupler type of the paper. Other effective refractive index variation occurs for differently arranged waveguide couplers, but, variation always occurs. As described above, the variation in effective refractive index results in substantial aberration to the output coupled beam, as is illustrated in FIG. 4.

The solution of the present invention is to provide the coupler with grooves at a variable grating period which offsets the wavefront aberrations produced by the variable effective refractive index. The potential wavefront aberration due to the variable effective refractive index is thereby corrected.

The change in output angle of the beam as a function of the length along the direction the guided wave travels (x axis) in the waveguide can be calculated using the grating equation, $$\mathrm{Sin}(theta(x)) = (Ne(x)/n - lambda/d * n)$$

where x is the distance along the waveguide in the direction which the guided optical wave travels, measured from the center of the outcoupled optical wave, theta(x) is the output angle variation from the perpendicular to the guided optical wave, n is the refractive index of the medium the beam is coupled into, lambda is the wavelength of light used, d is the grating period, and Ne(x) is the resultant effective index of refraction.

From the output angle variation, the wavefront error illustrated in FIG. 4 can be calculated. For the Gaussian waveguide coupler of FIG. 4, the output beam wavefront error is dominated by quadratic focus wavefront error.

For any waveguide coupler, setting the derivative of the above grating equation to zero, the condition of minimum change in the output coupling angle, theta(x), can be found. This is the condition for minimum wavefront error in the output beam.

The change in the output coupling angle attendant to the change in the effective refractive index of the waveguide is eliminated by changing the grating period along the x axis in a manner described by the grating period equation of the present invention, $$d(x) = lambda/(Ne(x)-c)$$

where c is the integration constant=$n*sin(theta_0)$ and $theta_0$ is the desired outcoupled angle.

Figure 5:
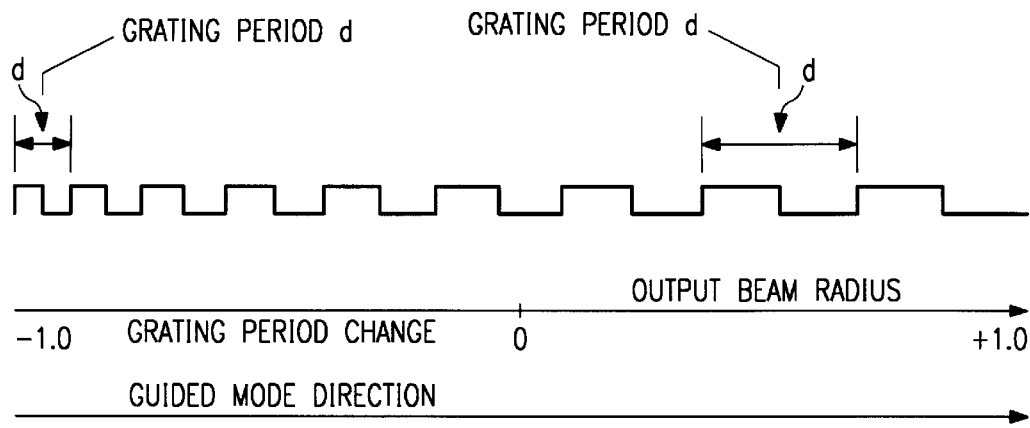
FIG. 5 is an exaggerated diagram of the variable grating period of a variable groove depth grating coupler in accordance with the present invention.

FIG. 5 illustrates, in a greatly exaggerated manner, the grating period (d) variation necessary to eliminate the wavefront error.

Figure 6:
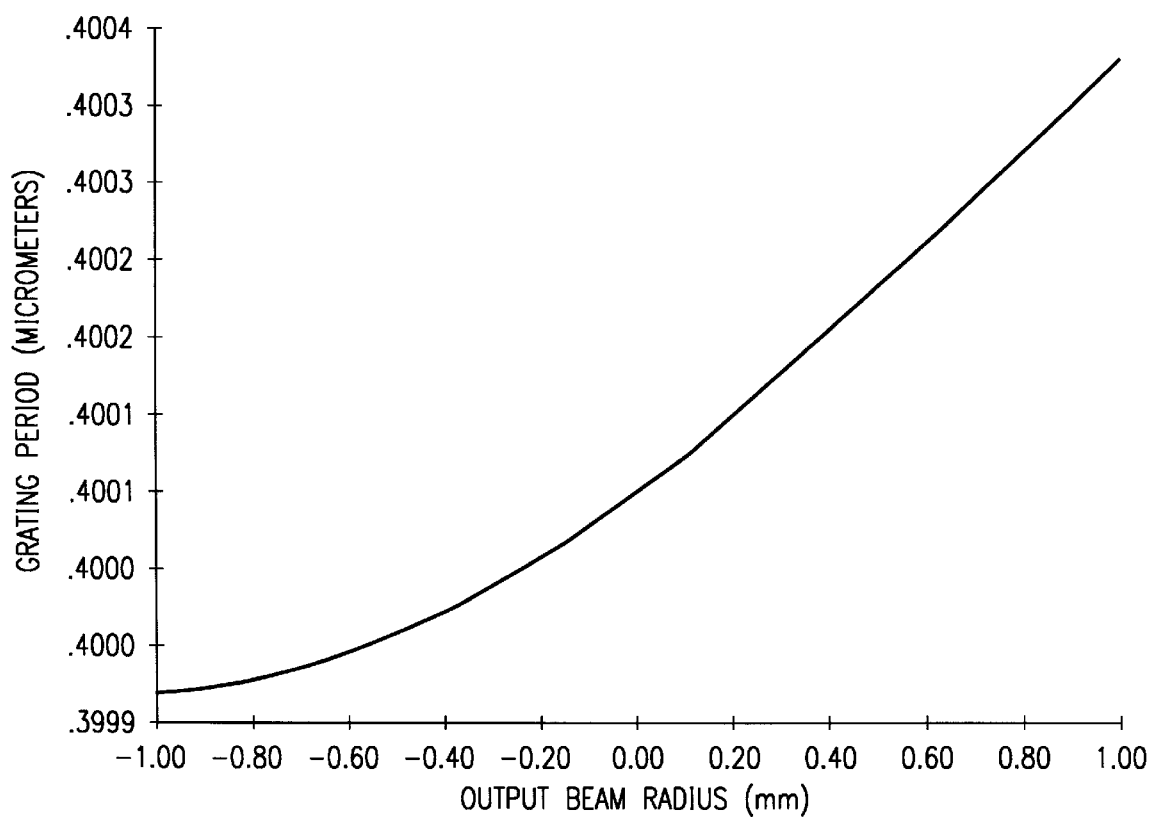
FIG. 6 is a graph of the grating period of the variable groove depth grating coupler of FIG. 5.

FIG. 6 is a graphical representation of the specific grating period variation necessary to eliminate the wavefront error of FIG. 4 for the exemplary variable groove depth grating waveguide coupler (polystyrene) described in the Bates et al. paper, supra, for the usable portion of the outcoupled beam.

The method of the present invention applies to any variable groove depth grating waveguide coupler for any arbitrary out-coupled beam irradiance profile, that is, it is not limited to Gaussian beams. By reciprocity, this method applies to the in-coupled beam to a waveguide also. The method provides aberration free beams from waveguides or to introduce optical aberrations in the out-coupled beams.

While the preferred embodiments of the present invention have been illustrated in detail, it should be apparent that modifications and adaptations to those embodiments may occur to one skilled in the art without departing from the scope of the present invention as set forth in the following claims.

I claim:

1. A bidirectional optical waveguide coupler device coupling into and out of an optical waveguide comprising:
    a variable groove depth grating coupler located on a surface of said optical waveguide which couples the guided optical wave traveling in said optical waveguide to a coupled external wave, said coupler having a plurality of grooves of variable depth and resultant variable effective refractive index,
    wherein said coupler grooves are provided at a variable grating period which offsets effects on wavefront quality of said variable effective refractive index, whereby the wavefront for said coupled optical wave is corrected against aberration.

2. The optical waveguide coupler device of claim 1, wherein:
    the index of refraction of the material of said optical waveguide is greater than 1; and
    the index of refraction of the medium said coupled external wave is coupled to is approximately 1.

3. The optical waveguide coupler device of claim 2, wherein:
    said variable groove depth grating coupler is arranged to provide an outcoupled Gaussian wave.

4. The optical waveguide coupler device of claim 2, wherein:
    said variable groove depth grating coupler is arranged to provide said coupled optical wave at a changing output angle according to the equation $$Sin(theta(x)) = (Ne(x)/n - lambda/d*n)$$

where x is the distance along the waveguide in the direction which a guided optical wave travels, measured from the center of an outcoupled optical wave, theta(x) is the output angle variation from the perpendicular to the guided optical wave, n is the refractive index of the medium the beam is coupled into, lambda is the wavelength of light used, d is the grating period, and Ne(x) is the resultant effective index of refraction; and said coupler grooves are provided at a variable grating period according to the equation $$d(x) = lambda/(Ne(x)-c)$$

where c is the integration constant=$n*sin(theta_0)$ and $theta_0$ is the desired outcoupled angle.

5. An optical grating coupler for an optical waveguide, which optical waveguide guides an optical wave therethrough, said optical grating coupler located on a surface of said optical waveguide and couples the guided optical wave traveling in said optical waveguide to an outcoupled optical wave, said optical grating coupler comprising:
    a plurality of coupler grooves of variable depth and resultant variable effective refractive index; and
    said plurality of coupler grooves are at a variable grating period which offsets effects on wavefront quality of said variable effective refractive index, whereby the wavefront for said outcoupled optical wave is corrected against aberration.

6. The optical grating coupler of claim 5, wherein:
    the index of refraction of the material of said optical waveguide is greater than 1; and
    the index of refraction of the medium said outcoupled optical wave is coupled to is approximately 1.

7. The optical grating coupler of claim 6, wherein:
    said plurality of variable depth coupler grooves are arranged to provide a Gaussian beam.

8. The optical grating coupler of claim 6, wherein:
    said plurality of variable depth coupler grooves are arranged to provide said outcoupled optical wave at a changing output angle according to the equation $$Sin(theta(x)) = (Ne(x)/n - lambda/d*n)$$

where x is the distance along the waveguide in the direction which the guided optical wave travels, measured from the center of the outcoupled optical wave, theta(x) is the output angle variation from the perpendicular to the guided optical wave, n is the refractive index of the medium the beam is coupled into, lambda is the wavelength of light used, d is the grating period, and Ne(x) is the resultant effective index of refraction; and said plurality of variable depth coupler grooves are provided at a variable grating period according to the equation $$d(x) = lambda/(Ne(x)-c)$$

where c is the integration constant=$n*sin(theta_0)$ and $theta_0$ is the desired outcoupled angle.

9. A method for providing wavefront correction for a variable groove depth grating waveguide coupler, said variable groove depth grating waveguide coupler located on a surface of an optical waveguide for coupling between an optical wave traveling in said optical waveguide and an outcoupled optical wave by means of a plurality of coupler grooves, said method comprising the steps of:

determining the resultant variable effective refractive index of said variable groove depth grating waveguide coupler; and establishing said plurality of coupler grooves at a variable grating period which offsets effects on wavefront quality of said variable effective refractive index, whereby the wavefront for said outcoupled optical wave is corrected against aberration.

10. The method for providing wavefront correction of claim 9, wherein:

the index of refraction of the material of said optical waveguide is greater than 1; and the index of refraction of the medium said outcoupled optical wave is coupled to is approximately 1.

11. The method for providing wavefront correction of claim 10, wherein:

said plurality of coupler grooves are arranged to provide a Gaussian beam.

12. The method for providing wavefront correction of claim 10, wherein:

said step of determining the resultant variable effective refractive index of said variable groove depth grating waveguide coupler comprises determining whether said plurality of coupler grooves are arranged to provide said outcoupled optical wave at a changing output angle according to the equation $$\mathrm{Sin}(theta(x)) = (Ne(x)/n - lambda/d*n)$$

where x is the distance along the waveguide in the direction which the guided optical wave travels, measured from the center of the outcoupled optical wave, theta(x) is the output angle variation from the perpendicular to the guided optical wave, n is the refractive index of the medium the beam is coupled into, lambda is the wavelength of light used, d is the grating period, and Ne(x) is the resultant effective index of refraction; and said step of establishing said plurality of coupler grooves at a variable grating period which offsets said variable effective refractive index comprises providing said coupler grooves at a variable grating period according to the equation $$d(x) = lambda/(Ne(x) - c)$$

where c is the integration constant=$n*\sin(theta_0)$ and $theta_0$ is the desired outcoupled angle.

* * * * *